US009362776B2

(12) United States Patent
Low et al.

(10) Patent No.: US 9,362,776 B2
(45) Date of Patent: Jun. 7, 2016

(54) WIRELESS CHARGING SYSTEMS AND METHODS

(71) Applicant: QUALCOMM Incorporated, San Diego, CA (US)

(72) Inventors: Zhen Ning Low, San Diego, CA (US); Jatupum Jenwatanavet, San Diego, CA (US); Ngo Van Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 13/802,595

(22) Filed: Mar. 13, 2013

(65) Prior Publication Data
US 2014/0143933 A1 May 29, 2014

Related U.S. Application Data

(60) Provisional application No. 61/730,492, filed on Nov. 27, 2012, provisional application No. 61/747,185, filed on Dec. 28, 2012.

(51) Int. Cl.
*H02J 7/00* (2006.01)
*H02J 7/14* (2006.01)
(Continued)

(52) U.S. Cl.
CPC ............... *H02J 7/025* (2013.01); *G04C 10/00* (2013.01); *H01F 38/14* (2013.01); *H02J 7/045* (2013.01);
(Continued)

(58) Field of Classification Search
USPC ......... 320/108, 137, 107, 110, 112, 113, 114, 320/115; 307/104, 9.1
See application file for complete search history.

(56) References Cited

U.S. PATENT DOCUMENTS 6,127,799 A 10/2000 Krishnan
6,350,055 B1 * 2/2002 Barras ........................ 368/281
(Continued)

FOREIGN PATENT DOCUMENTS

EP 0298707 A2 1/1989
EP 1315051 5/2003
(Continued)

OTHER PUBLICATIONS

Lee S., et al., "Active EMF cancellation method for I-type pickup of On-Line Electric Vehicles", Applied power electronics conference and exposition (apec), 2011, 26th annual IEEE, IEEE, XP032014151, DOI: 10.1109/APEC.2011.5744868, ISBN: 978-1-4244-8084-5, Mar. 6, 2011.
(Continued)

Primary Examiner — Alexis A Boateng
(74) Attorney, Agent, or Firm — James Gutierrez

(57) ABSTRACT

An embodiment of a system for wirelessly charging a wrist-worn device may include a radio frequency (RF) charging energy generating element, and an antenna configured to radiate the RF charging energy, the antenna comprising a first coil and a second coil, the first coil and the second coil each comprising a plurality of windings, the windings of the first coil being wound in a direction opposite the direction of the windings of the second coil. An embodiment of a wrist-worn charge-receiving device may include an antenna coil adapted to receive radio frequency (RF) charging energy, the antenna coil comprising non-uniform windings; and a rechargeable power source coupled to the antenna coil, the antenna coil adapted to provide the RF charging energy to the rechargeable power source.

24 Claims, 20 Drawing Sheets

(51) Int. Cl.
*H02J 7/02* (2006.01)
*H02J 7/04* (2006.01)
*G04C 10/00* (2006.01)
*H01F 38/14* (2006.01)
*G04D 1/06* (2006.01)
*H02J 5/00* (2006.01)

(52) U.S. Cl.
CPC .............. *G04D 1/066* (2013.01); *H02J 5/005* (2013.01); *H02J 7/0004* (2013.01); *H02J 7/0013* (2013.01); *H02J 7/0027* (2013.01)

(56) References Cited

U.S. PATENT DOCUMENTS

| | | | |
|---|---|---|---|
| 6,854,978 B2* | 2/2005 | Noirjean | 439/37 |
| 7,175,339 B2 | 2/2007 | Bisig | |
| 7,952,324 B2 | 5/2011 | Cheng et al. | |
| 8,111,041 B2 | 2/2012 | Onishi et al. | |
| 8,269,375 B2 | 9/2012 | Sogabe et al. | |
| 2003/0099161 A1* | 5/2003 | Bisig | 368/82 |
| 2007/0103267 A1* | 5/2007 | Okada | 336/65 |
| 2008/0054729 A1 | 3/2008 | Greene et al. | |
| 2011/0109263 A1* | 5/2011 | Sakoda et al. | 320/108 |
| 2012/0153954 A1* | 6/2012 | Ota et al. | 324/318 |
| 2012/0242285 A1* | 9/2012 | Jung et al. | 320/108 |
| 2013/0038282 A1* | 2/2013 | Shimokawa | 320/108 |
| 2013/0082652 A1* | 4/2013 | Jung | 320/108 |
| 2013/0093255 A1* | 4/2013 | Jung et al. | 307/104 |
| 2013/0134794 A1* | 5/2013 | Lee et al. | 307/104 |
| 2014/0117927 A1* | 5/2014 | Chateau et al. | 320/108 |

FOREIGN PATENT DOCUMENTS

| | | | |
|---|---|---|---|
| EP | 2428969 | A2 | 3/2012 |
| EP | 2711946 | A1 * | 3/2014 |
| GB | 2201266 | A | 8/1988 |
| JP | 2005278318 | A | 10/2005 |
| WO | 03034569 | A2 | 4/2003 |
| WO | WO-2004038888 | A2 | 5/2004 |
| WO | WO-2009147587 | A1 | 12/2009 |
| WO | WO-2011138507 | A2 | 11/2011 |

OTHER PUBLICATIONS

International Search Report and Written Opinion—PCT/US2013/071600—ISA/EPO—Aug. 27, 2014.

* cited by examiner

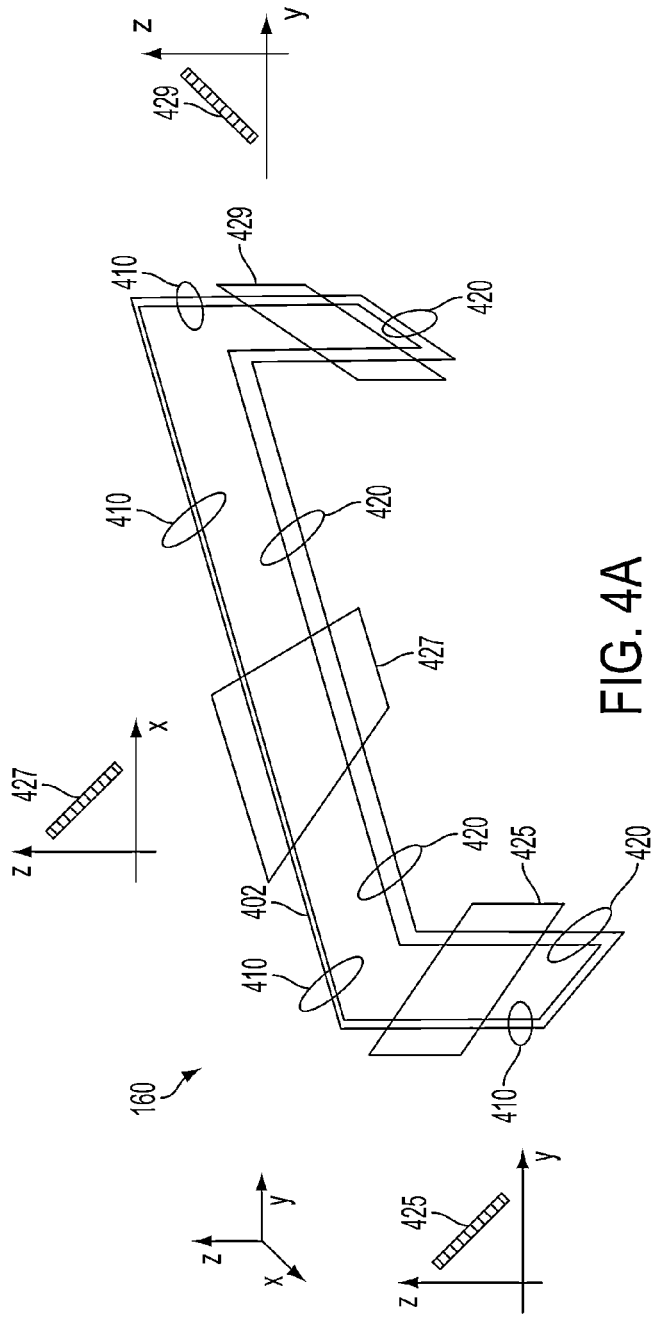
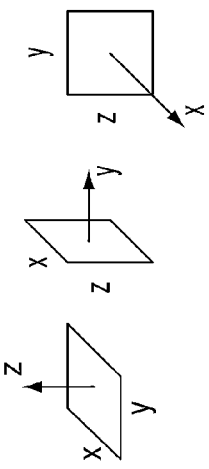
FIG. 4A
FIG. 4C
FIG. 4B

WIRELESS CHARGING SYSTEMS AND METHODS

RELATED APPLICATIONS

This application claims priority to, and the benefit of the filing dates of, U.S. Provisional Application No. 61/730,492, filed on Nov. 27, 2012, entitled "Apparatus for Wirelessly Charging A Wrist-Worn Device" and U.S. Provisional Application No. 61/747,185, filed on Dec. 28, 2012, entitled "Wireless Charging System," both of which are hereby incorporated into this document by reference.

DESCRIPTION OF THE RELATED ART

Many portable wireless devices rely on rechargeable power sources. The form factor of such portable devices vary significantly, but particular form factors that are gaining popularity are portable devices incorporated into a wrist-worn device or a neck-worn device. An example of a small, wrist-worn device is one that can be paired with a wireless headset or earpiece to function as a portable cellular telephone. Other devices and device functionality can be incorporated into a wrist-worn device.

A common requirement for each of these devices is that they are typically powered by a small, rechargeable power source, such as a rechargeable battery. Under normal operating conditions, the rechargeable battery must be frequently recharged. One manner of recharging the battery is to use a wired charger that requires a household alternating-current (AC) source to supply the charging energy directly to the device. One problem with a wired charging arrangement is that the device to be charged must include a connector port to which a corresponding connector on the charger is connected. Such connectors require physical space, and make it difficult to seal the enclosure of the device to provide a watertight or water resistant package.

It would be desirable for charging to occur without the need for a wired connection. Further, wireless charging allows a device to be manufactured without an external charging connection, which facilitates the fabrication of a watertight or water resistant package. Wireless charging also provides freedom of movement for the user and allows multiple devices to be charged simultaneously. Examples of devices that may benefit from a wireless charging connection include, but are not limited to, a wireless headset, a multiple-function wrist-watch, a wrist-worn display or other wrist-worn device, a hearing aid, an electronic earpiece, or other devices.

SUMMARY

An embodiment of a system for wirelessly charging a wrist-worn device comprises a radio frequency (RF) charging energy generating element, and an antenna configured to radiate the RF charging energy, the antenna comprising a first coil and a second coil, the first coil and the second coil each comprising a plurality of windings, the windings of the first coil being wound in a direction opposite the direction of the windings of the second coil.

An embodiment of a wrist-worn charge-receiving device comprises an antenna coil adapted to receive radio frequency (RF) charging energy, the antenna coil comprising non-uniform windings and a rechargeable power source coupled to the antenna coil, the antenna coil adapted to provide the RF charging energy to the rechargeable power source.

An embodiment of a system for wirelessly charging a wrist-worn device comprises a radio frequency (RF) charging energy generating element, a transmit antenna configured to radiate the RF charging energy, the transmit antenna comprising a first coil and a second coil, the first coil and the second coil each comprising a plurality of windings, the windings of the first coil being wound in a direction opposite the direction of the windings of the second coil, and a charge receiving device located between the first coil and the second coil, the charge receiving device comprising a receive antenna coil and a rechargeable power source coupled to the receive antenna coil, the receive antenna coil comprising non-uniform windings adapted to receive the RF charging energy and provide the RF charging energy to the rechargeable power source.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

FIGS. 4A, 4B and 4C are schematic diagrams illustrating an embodiment of the receive antenna of FIG. 1.

DETAILED DESCRIPTION

Figure 1:
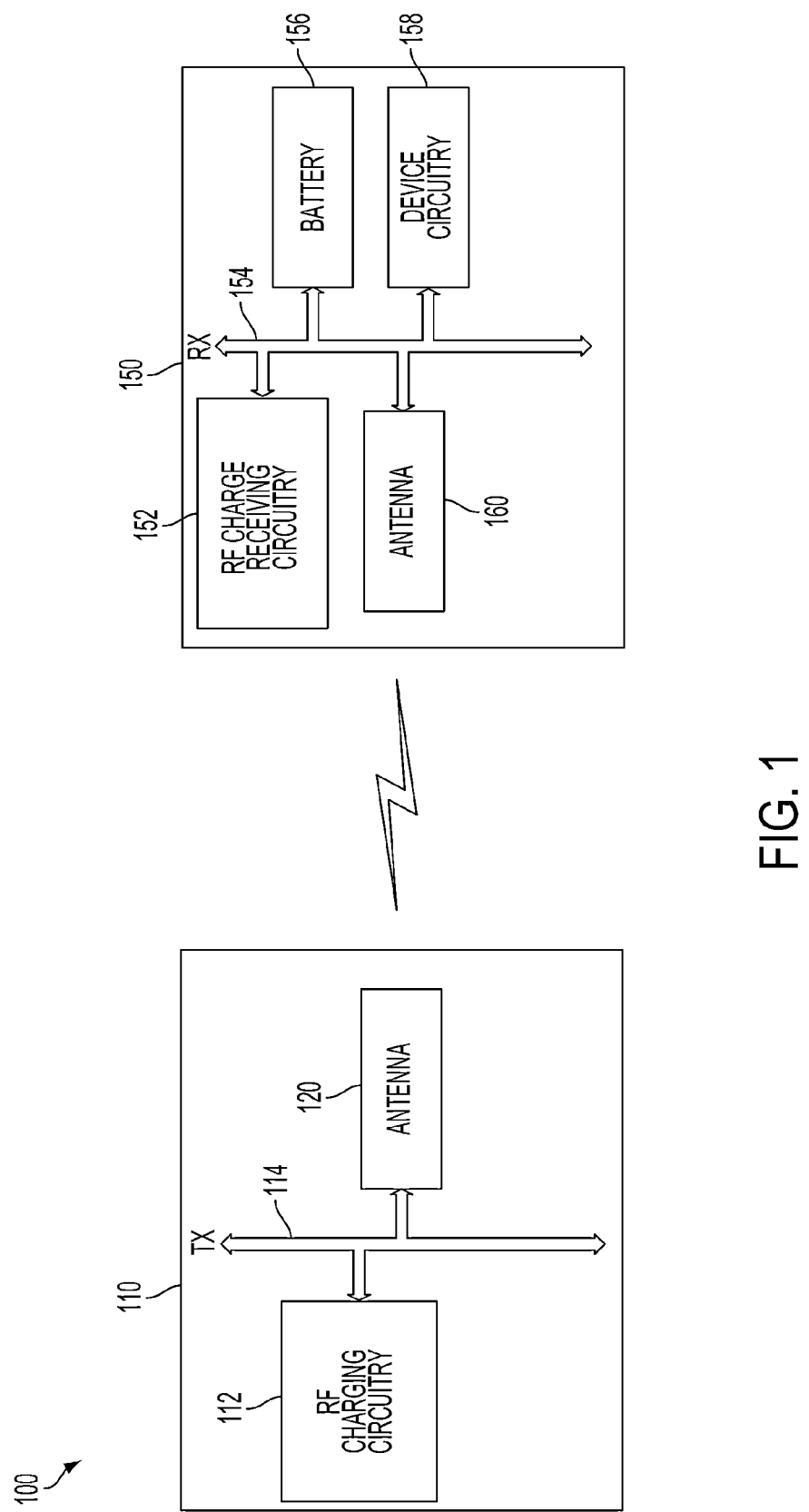
FIG. 1 is a block diagram illustrating an embodiment of a system for wirelessly charging a wrist-worn device.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Although described below as particularly applicable to a wrist-worn device, the system and method for wirelessly charging a wireless device can be incorporated into, used with, or otherwise applied to any portable device having a rechargeable power source.

As used herein, the term "wrist-worn" device includes any electronic or electric device that can be incorporated into a wrist-worn form factor, such as a wristband, and that uses a rechargeable power source, such as a rechargeable battery.

As used herein, the term "neck-worn" device includes any electronic or electric device that can be incorporated into a neck-worn form factor that uses a rechargeable power source, such as a rechargeable battery.

As used herein, the terms "wireless charger," "inductive charger," "charging station," "power transmitter," and "transmitter portion" are used herein to refer to any device that includes one or more induction coils (i.e., coil antenna and/or inductive coil) and circuitry that applies an alternating electrical current to the induction coil to generate an alternating electromagnetic field suitable for wirelessly charging wireless rechargeable devices. Inductive chargers may provide power to a single wireless rechargeable device at a time, or may provide power to multiple wireless rechargeable devices at the same time.

As used herein, the terms "wireless rechargeable device," "charge-receiving device," "power receiver" and "receiver portion" are used to refer to any device that includes one or more induction coils (i.e., coil antenna and/or inductive coil) and/or an inductive charging circuit configured such that when it is placed within an electromagnetic field generated by an inductive charger, an electrical current is generated in the device. A wireless rechargeable device may utilize the generated electrical current to power the wireless rechargeable device and/or charge a battery of the wireless rechargeable device.

In the various embodiments, a wireless charging system (also referred to herein as an "inductive charging system" and a "wireless charging system") may include an inductive charger and at least one wireless rechargeable device, but multiple wireless rechargeable devices (e.g., two wireless rechargeable devices, three wireless rechargeable devices, four wireless rechargeable devices, five wireless rechargeable devices, etc) may be included in the system or apparatus.

The systems, methods, and devices of the various embodiments provide flexibility in the orientation of wireless rechargeable devices with respect to wireless chargers in a wireless charging system. The various embodiments free users from worrying about the orientation of their wireless rechargeable devices when placed on or near the transmitting surface of a wireless charger. The various embodiments increase the probability that one of the receive coils of a wireless rechargeable device magnetically couples with a transmit coil of a wireless charger no matter how the user deposits the wireless rechargeable device on or near the charger. In this manner, the various embodiments increase the geometric transmission freedom of a wireless charging system.

In an embodiment, a wireless rechargeable device may have two or more receive coils and a wireless charger may have one or more transmit coils. In an embodiment, a wireless rechargeable device may include a receive coil on each surface on which the wireless rechargeable device is capable of resting. In this manner, no matter how a user lays the wireless rechargeable device on or near a wireless charger, a receive coil of the wireless rechargeable device will align and magnetically couple with a transmit coil of a wireless charger to enable power from the wireless charger to be transmitted to the wireless rechargeable device. The number of coils on the wireless rechargeable device and on the wireless charger may define the number of possible charging orientations. As an example, two coils on the wireless rechargeable device and two coils on the charger may result in four potential orientations that enabling charging. As another example, two coils on the wireless rechargeable device and four coils on the charger may result in eight potential orientations for enabling charging. As a further example, four coils on the wireless rechargeable device and four coils on the charger may result in sixteen potential orientations for enabling charging. In the various embodiments, the number of receive coils on the wireless rechargeable device may be selected based on the number of surfaces on which the wireless rechargeable device may rest when placed on or near the wireless charger. In the various embodiments, the number of transmit coils within the wireless charger device may be selected to increase the probability that a receive coil of the wireless rechargeable device aligns with a transmit coil of the wireless charger to enable inductive charging.

FIG. 1 is a block diagram illustrating an embodiment of an apparatus for wirelessly charging a wrist-worn device. The apparatus 100 for wirelessly charging a wrist-worn device generally comprises a transmitter portion 110, also referred to as a wireless charger, and a receiver portion 150, also referred to as a wireless rechargeable device, or a charge-receiving device. The transmitter portion 110 comprises radio frequency (RF) charging circuitry 112 and a transmit antenna 120 connected over a communication bus 114. The communication bus 114 can be any physical and/or logical communication infrastructure that allows the connected elements to communication and interoperate.

The receiver portion 150 comprises radio frequency (RF) charge receiving circuitry 152, a rechargeable power source, such as a battery 156, device circuitry 158 and an antenna 160, connected over a communication bus 154. The communication bus 154 can be any physical and/or logical communication infrastructure that allows the connected elements to communication and interoperate.

In an embodiment, the transmit antenna 120 is designed to increase the transfer of charging energy to the receive antenna 160, and the receive antenna 160 is designed to increase the charging energy received from the transmit antenna 120.

Figure 2:
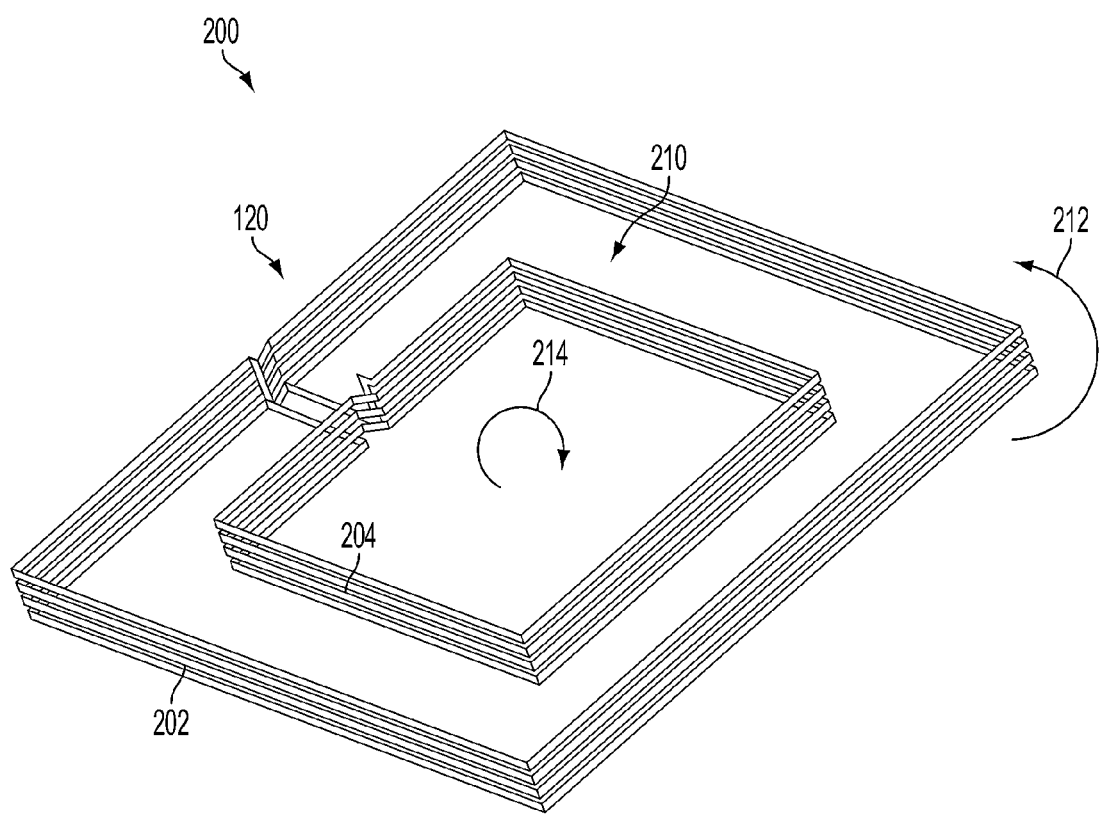
FIG. 2 is a schematic diagram illustrating an embodiment of the transmit antenna of FIG. 1.

FIG. 2 is a schematic diagram illustrating an embodiment of the transmit antenna 120 of FIG. 1. In an embodiment, the transmit antenna 120 comprises an outer coil 202 and an inner coil 204. The outer coil 202 and the inner coil 204 can also be referred to as "inductive" or "induction" coils as they inductively impart charging energy to one or more coils located in a charge-receiving device. The outer coil 202 and the inner coil 204 are generally coplanar, and comprise multiple windings. In an embodiment, the outer coil 202 is wound in a direction 212 opposite the direction 214 of the windings of the inner coil 204. The direction of the windings of the outer coil 202 and the inner coil 204 are arbitrary and can be wound in a direction opposite to that shown herein. Winding the outer coil 202 in a direction 212 opposite the direction 214 of the winding of the inner coil 204 confines a magnetic field substantially to an area 210 located between the outer coil 202 and the inner coil 204. As will be described in greater detail below, the area 210 between the outer coil 202 and the inner coil 204 is a location to preferably locate the receive antenna 160 (FIG. 1) to receive increased charging energy from the antenna 120.

Figure 3:
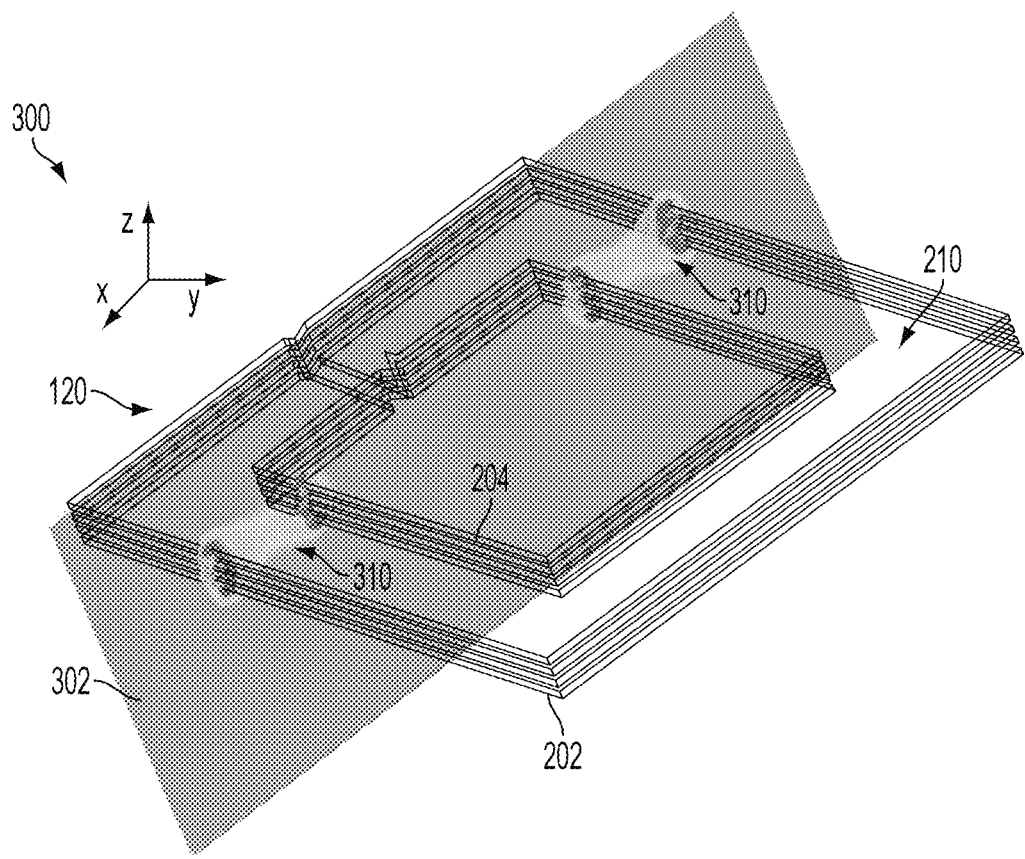
FIG. 3 is a schematic diagram illustrating an example magnetic field generated by the antenna of FIG. 2.

FIG. 3 is a schematic diagram illustrating an example magnetic field generated by the antenna 120 of FIG. 2. A plane 302 is illustrated with respect to the antenna 120. The location of the plane 302 is shown for reference only to illustrate the distribution of a magnetic field 310 that exists in the area 210 located between the outer coil 202 and the inner coil 204. The opposite direction of the windings of the outer coil 202 and the inner coil 204 generally confines and focuses the magnetic field 310 to the area 210 because the energy in the magnetic field from each coil is added together in the area 210 and prevents magnetic energy from occurring outside of the outer coil 202 and inside of the inner coil 204 because the energy in the magnetic field from each coil is subtracted from each other in the areas outside of the outer coil 202 and inside of the inner coil 204. In the example shown in FIG. 3, the outer coil 202 and the inner coil 204 occupy the x-y plane and the magnetic field is generated in the z plane. The plane 302 is illustrated as occupying the x-z plane. However, although not shown in FIG. 3, the magnetic field 310 also occupies the y-z plane.

FIGS. 4A, 4B and 4C are schematic diagrams illustrating an embodiment of the receive antenna 160 of FIG. 1. The receive antenna 160 generally comprises a multiple winding coil 402 that has non-uniform spacing between the windings in different portions of the coil 402. For example, the spacing between the windings in the general areas 410 is narrower than the spacing of the coil windings in the general areas 420. Non-uniform spacing of the windings of the coil 402 allows the portion of the coil 402 that is located on an edge of a wristband band to be narrow (e.g., to be able to fit all turns in the edge) and allows the portion of the coil 402 that is located on a large surface of a wristband band to be wider (e.g., to reduce inter-winding coupling). Further, the windings in the areas 410 can be located in a plane that is different than the plane in which the windings in the areas 420 are located. For example, the windings in the areas 410 can be located in or tilted with respect to a plane defined by the "x" and "y" axes of a Cartesian coordinate system, while the windings in the areas 420 can be located in or tilted with respect to a plane defined by the "x" and "z" or "y" and "z" axes of a Cartesian coordinate system. In this manner, a receive antenna 160 incorporated into a wrist-worn structure can receive charging energy from the transmit antenna 120 described herein.

In an embodiment, the receive antenna 160 generally comprises a "C" shaped configuration, or position, because it is designed to be used within a wrist-worn structure, such as a wristband, that may include a clasp, buckle, snap, or other fastening mechanism that allows it to be opened, placed around a wrist, and then fastened around a wrist.

In an embodiment, a device in which the receive antenna 160 may be incorporated may have any of a loop-shaped configuration, or position, and a C-shaped configuration, or position, and may be configured to be moved between the loop-shaped configuration, or position, and the C-shaped configuration, or position, to accommodate being located in a wristband that can be opened to a "C" shaped position to allow the wristband to be placed around a wrist and then closed to a loop-shaped position when the wristband is secured around a wrist. Further, the receive antenna 160 can be generally shaped to fit a number of different applications. Non-limiting examples of loop-shaped configurations of the receive antenna 160 include circular, triangular, hexagonal, pentagonal, and any other looped shape. Of course, the receive antenna 160 may have other suitable shapes.

The non-uniform spacing between windings of the coil 402 and the shape of the coil 402 create what are referred to as one or more "charging planes" located as shown. In this example, the charging planes 425, 427 and 429 are shown for illustration. The non-uniform spacing between windings of the coil 402 allows each charging plane 425, 427 and 429 to be tilted with respect to the planes formed by the major axes x, y and z of the Cartesian coordinate system and to accommodate the shape, configuration and structure of the wrist-worn device into which the coil 402 is incorporated. As used herein, the term "tilted charging plane" is defined as a plane that does not correspond to any plane defined by the major axes in a Cartesian coordinate system. For example, the x-y plane, the x-z plane and the y-z plane are planes that are defined by the x, y and z axes in a Cartesian coordinate system. When described using the Cartesian coordinate system having x, y and z axes, a "tilted charging plane" is a plane other than the x-y plane, the x-z plane and the y-z plane.

FIG. 4C is a schematic diagram illustrating non-tilted charging planes and respective magnetic field vectors. The charging plane is the plane that is perpendicular to the vector of the magnetic field. For instance, if the vector of the magnetic field is parallel to the z axis, the charging plane is located in the x-y plane. If the vector of the magnetic field is parallel to the y axis, the charging plane is located in the x-z plane. If the magnetic field is parallel to the x axis, the charging plane is located in the y-z plane. Since a tilted charging plane is a plane other than any of the x-y plane, the x-z plane or the y-z plane, the tilted charging plane is able to couple the magnetic field in the z direction in the example shown in FIGS. 4A and 4B, even though the charging plane is not necessarily in the x-y plane. In this example, the charging plane is not implemented in the x-y plane due to the limitation of the structure of a band of a wrist-worn device in which the coil is located, particularly, the small area of the edge of the band.

In this example, the charging plane 425 is shown as being tilted with respect to a plane formed by the y-z axis, the charging plane 427 is shown as being tilted with respect to a plane formed by the x-z axis, and the charging plane 429 is shown as being tilted with respect to a plane formed by the y-z axis.

Figure 5A:
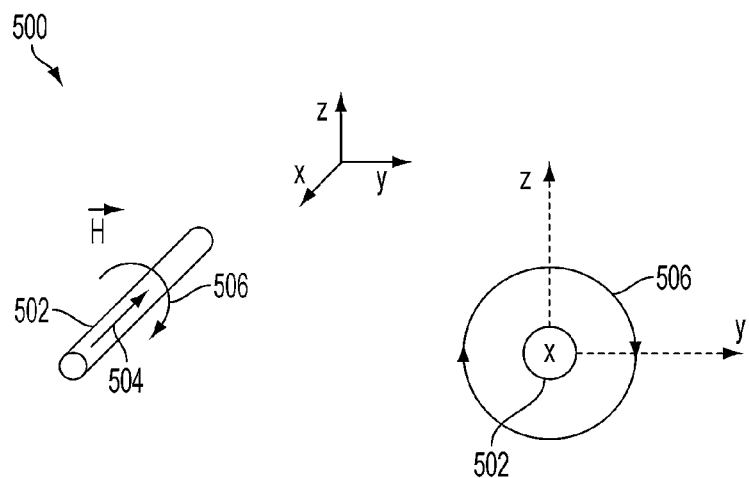
FIGS. 5A and 5B are a schematic diagrams illustrating a theory of operation of the receive antenna of FIG. 1.
Figure 5B:
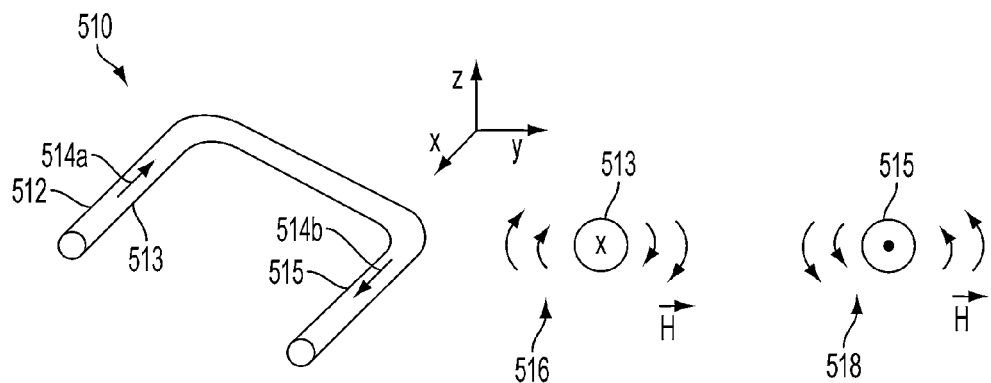

FIGS. 5A and 5B are a schematic diagrams illustrating a theory of operation of the receive antenna of FIG. 1. In FIG. 5A, a current denoted by an arrow 504 flows in a conductor 502. The conductor 502 can be a metallic wire (or other type of conductor) that is used to fabricate the receive antenna 160 and the transmit antenna 120 described above. The flow of the current 504 generates a magnetic field "H" 506 that circulates around the conductor 502 according to the "right hand rule." The current 504 flows in the "x" direction and the magnetic field 506 occurs on the y-z plane.

In FIG. 5B, a conductor 512 is generally "U" shaped and comprises a segment 513 and a segment 515. A current 514 is denoted by arrow 514a to denote current flowing in the segment 513 and an arrow 514b to denote current flowing in the segment 515. The current 514a generates a magnetic field 516 and the current 514b generates a magnetic field 518. If the conductor 512 is located in the x-y plane, then the "charging plane" is also located in the x-y plane because the charging plane is the plane that is perpendicular to the magnetic field.

Figure 6A:
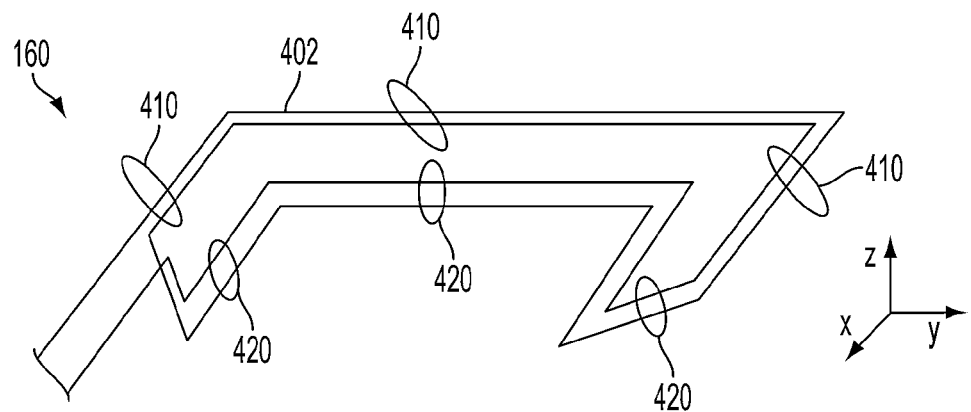
FIGS. 6A, 6B and 6C are a schematic diagrams illustrating alternative views an embodiment of the receive antenna of FIG. 1.
Figure 6B:
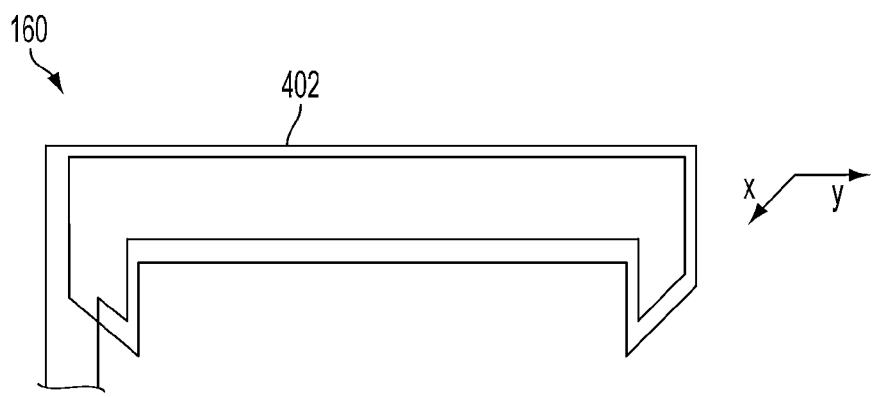
Figure 6C:
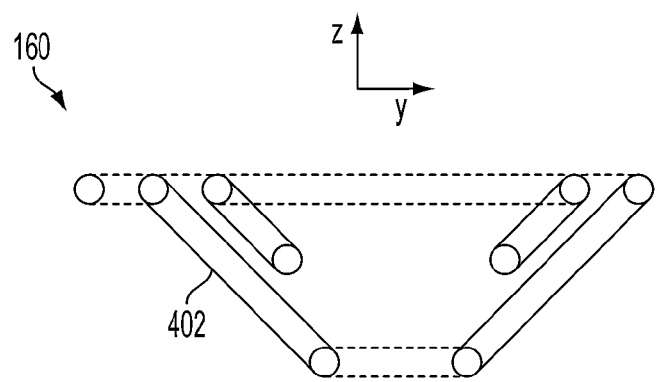

FIGS. 6A, 6B and 6C are a schematic diagrams illustrating alternative views an embodiment of the receive antenna of FIG. 1.

FIG. 6A is a perspective view of the receive antenna 160 of FIGS. 4A and 4B. FIG. 6B is a top plan view of the receive antenna 160 of FIGS. 4A and 4B taken in the x-y plane. FIG. 6C is a front plan view of the receive antenna 160 of FIGS. 4A and 4B taken in the y-z plane.

Figure 7:
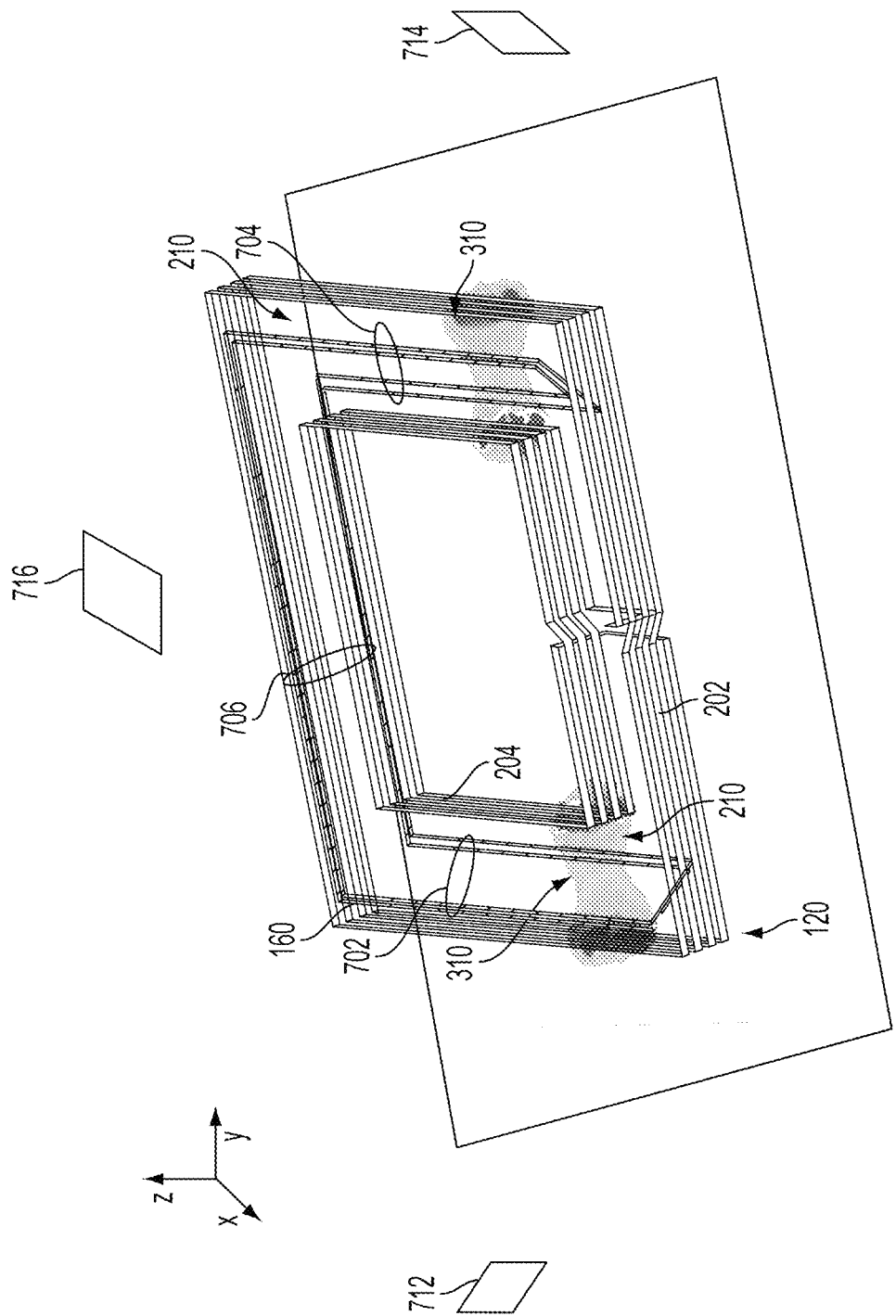
FIG. 7 is a schematic diagram illustrating an embodiment of the transmit antenna and receive antenna of FIG. 1.

FIG. 7 is a schematic diagram illustrating an embodiment of the transmit antenna 120 and receive antenna 160 of FIG. 1. In this example, the receive antenna 160 is located in the area 210 that is between the outer coil 202 and the inner coil 204. The charging plane of the antenna 160 is located with respect to the magnetic field 310 in such a way to increase the transfer of charging energy to the receive antenna 160. In this example, the portions 702, 704 and 706 of the receive antenna 160 are located in planes other than the x-z plane and the y-z plane. For example, the portion 702 of the receive antenna 160 forms a plane 712 that is "tilted" with respect to the x-z plane; the portion 704 of the receive antenna 160 forms a plane 714 that is "tilted" with respect to the x-z plane; and the portion 706 of the receive antenna 160 forms a plane 716 that is "tilted" with respect to the y-z plane.

Figure 8A:
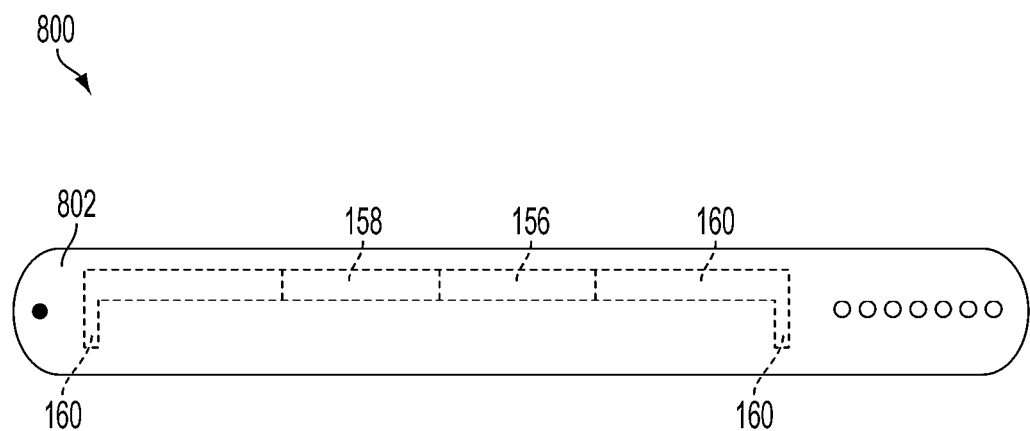
FIGS. 8A and 8B are schematic diagrams illustrating a wrist-worn device.
Figure 8B:
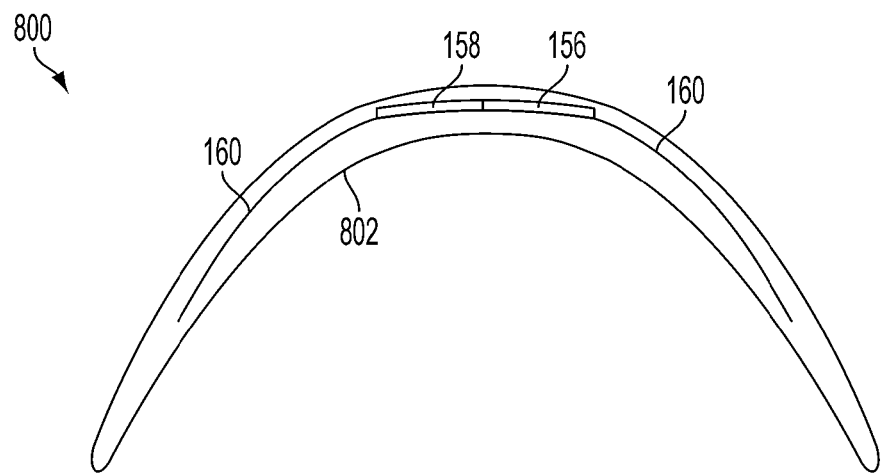

FIGS. 8A and 8B are schematic diagrams illustrating a wrist-worn device. The wrist-worn device 800 comprises a wristband 802 into which an antenna 160, a rechargeable power source, such as a battery 156 and circuitry 158, can be embedded, formed, or otherwise located.

Figure 9:
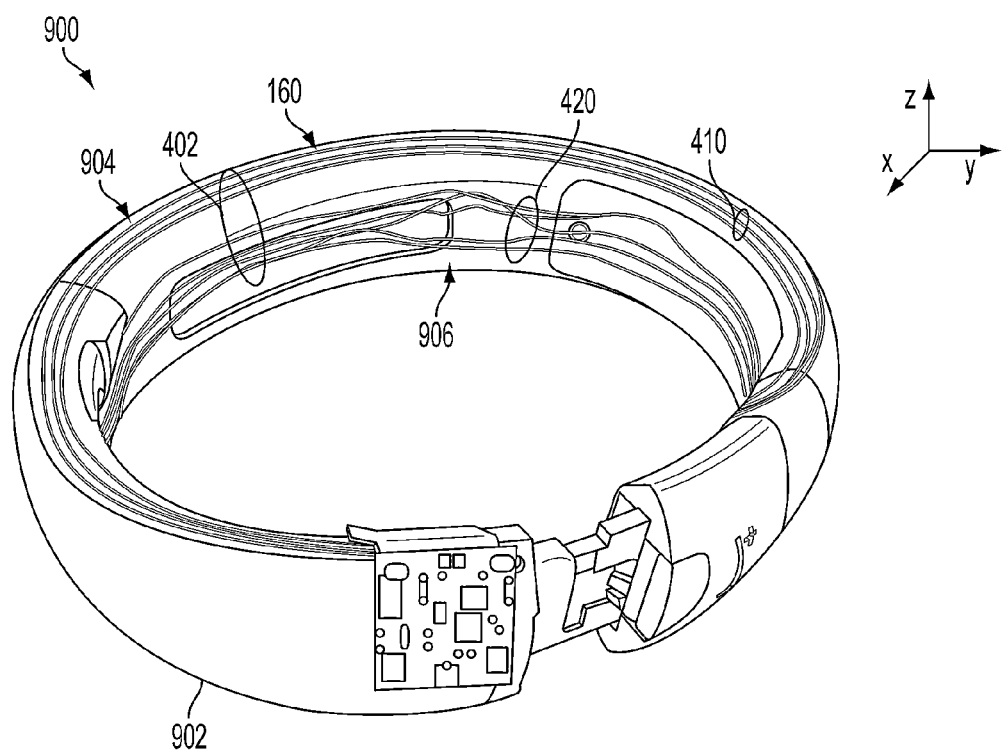
FIG. 9 is a schematic diagram illustrating the receive antenna of FIG. 1 located in a wristband shaped structure.

FIG. 9 is a schematic diagram illustrating the receive antenna of FIG. 1 located in a wristband shaped structure. The wristband shaped structure is schematically illustrated as a band 902, including a top edge 904 and an inner surface 906. In this example, the top edge 904 occupies the x-y plane and the inner surface occupies the x-z and the y-z planes.

The receive antenna 160 generally comprises a multiple winding coil 402 that has non-uniform spacing between the windings. For example, the spacing between the windings in the general area 410 is narrower than the spacing of the coil windings in the general area 420. Non-uniform spacing of the windings of the coil 402 allows the portion 410 of the coil 402 that is located on an edge 904 of a wristband band to be narrow (i.e., to be able to fit all turns in the edge) and allows the portion 420 of the coil 402 that is located on a large surface, such as surface 906, of the band 902 to be wider (i.e., to minimize inter-winding coupling). Further, the windings in the areas 410 can be located in a plane that is different than the plane in which the windings in the areas 420 are located. For example, the windings in the areas 410 can be located in or tilted with respect to a plane defined by the "x" and "y" axes of a Cartesian coordinate system, while the windings in the areas 420 can be located in or tilted with respect to a plane defined by the "x" and "z" or "y" and "z" axes of a Cartesian coordinate system.

Figure 10A:
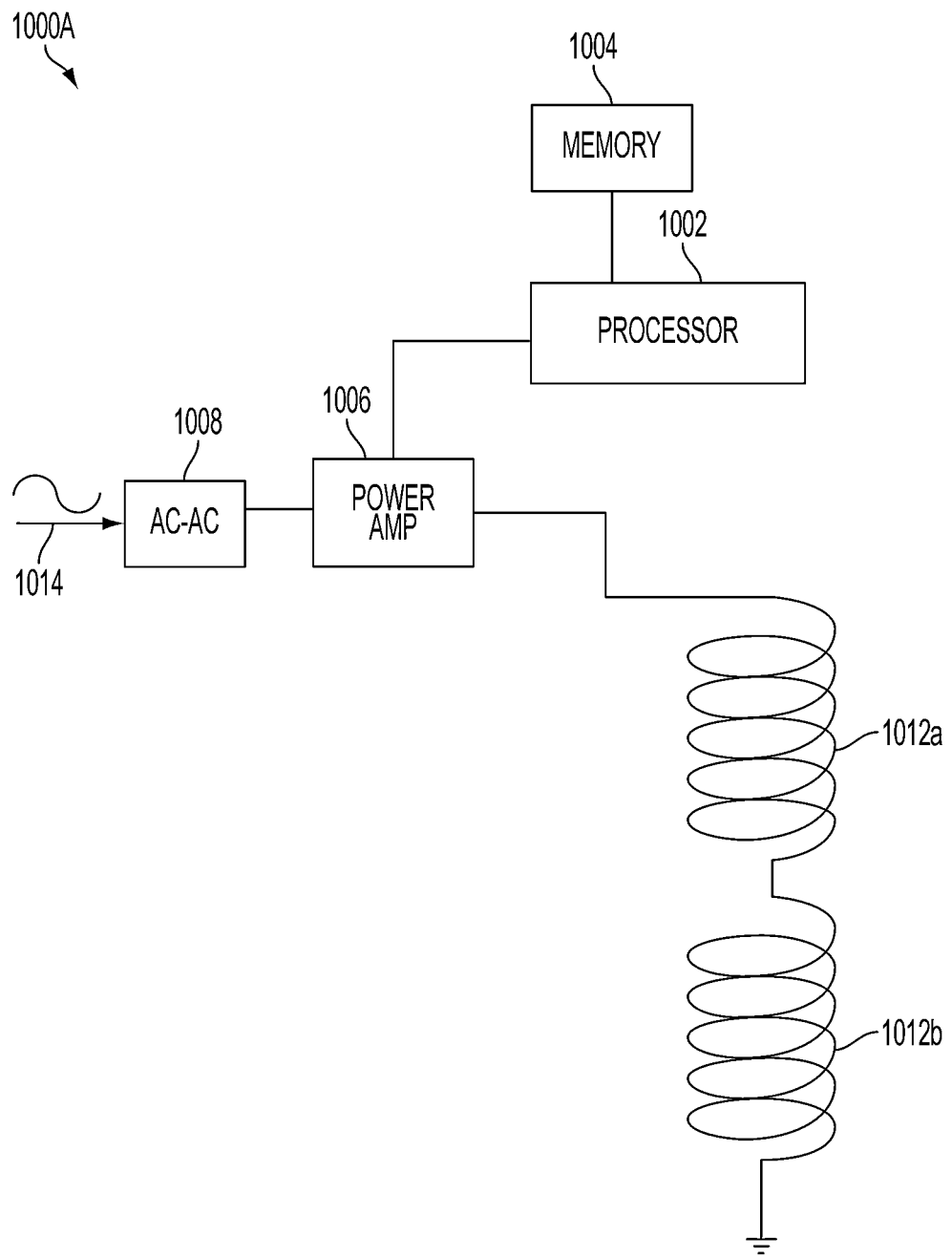
FIG. 10A is a block diagram of an embodiment of an inductive charger circuit suitable for use with the various embodiments.

FIG. 10A illustrates an inductive charger circuit 1000A suitable for use with the various embodiments. The inductive charger circuit 1000A can be an embodiment of the RF charging circuitry 112 of FIG. 1. In an embodiment, the transmitter portion 110 may include a inductive charger circuit 1000A configured to enable the transmitter portion 110 to wirelessly transmit power to a receiver portion 150 by generating a suitable alternating magnetic field. The inductive charger circuit 1000A may include a processor 1002 coupled to a memory 1004 and to a power amplifier 1006. In an embodiment, an alternating current ("AC") input 1014 may be coupled to an AC-to-AC converter 1008 configured to alter the frequency of the input current (e.g., 60 Hz) to a frequency suitable for wirelessly transmitting power to wireless rechargeable devices. The AC-to-AC converter 1008 may be coupled to a power amplifier 1006 which may be coupled to one or more induction coils 1012a and 1012b, which may be connected in series. Additional induction coils, such as one, two, three, four, or more additional induction coils, may be added in series with induction coils 1012a and 1012b. In the various embodiments, the number of transmit induction coils 1012a, 1012b included in the inductive charger circuit 1000A may be selected to increase the probability that a receive coil of a receiver portion 150 aligns with a transmit coil of the inductive charger circuit 1000A to enable efficient inductive charging.

In operation, the AC input received from the AC input 1014 may be converted to a higher frequency AC current by the AC-to-AC converter 1008, and the higher frequency AC current may be supplied to the power amplifier 1006. In an embodiment, the amount of current output by the power amplifier 1006 may be adjustable and the processor 1002 may be configured with processor-executable instructions stored in memory 1004 to control the operation of the power amplifier 1006. In an alternative circuit (not shown) a signal generator may provide an input AC signal with a frequency suitable for inductive charging to the power amplifier 1006 which may receive power from the AC input 1014 and output an amplified AC current to the induction coils 1012a and 1012b. Powered by the higher frequency AC current, the induction coils 1012a and 1012b generate an alternating electromagnetic field.

Figure 10B:
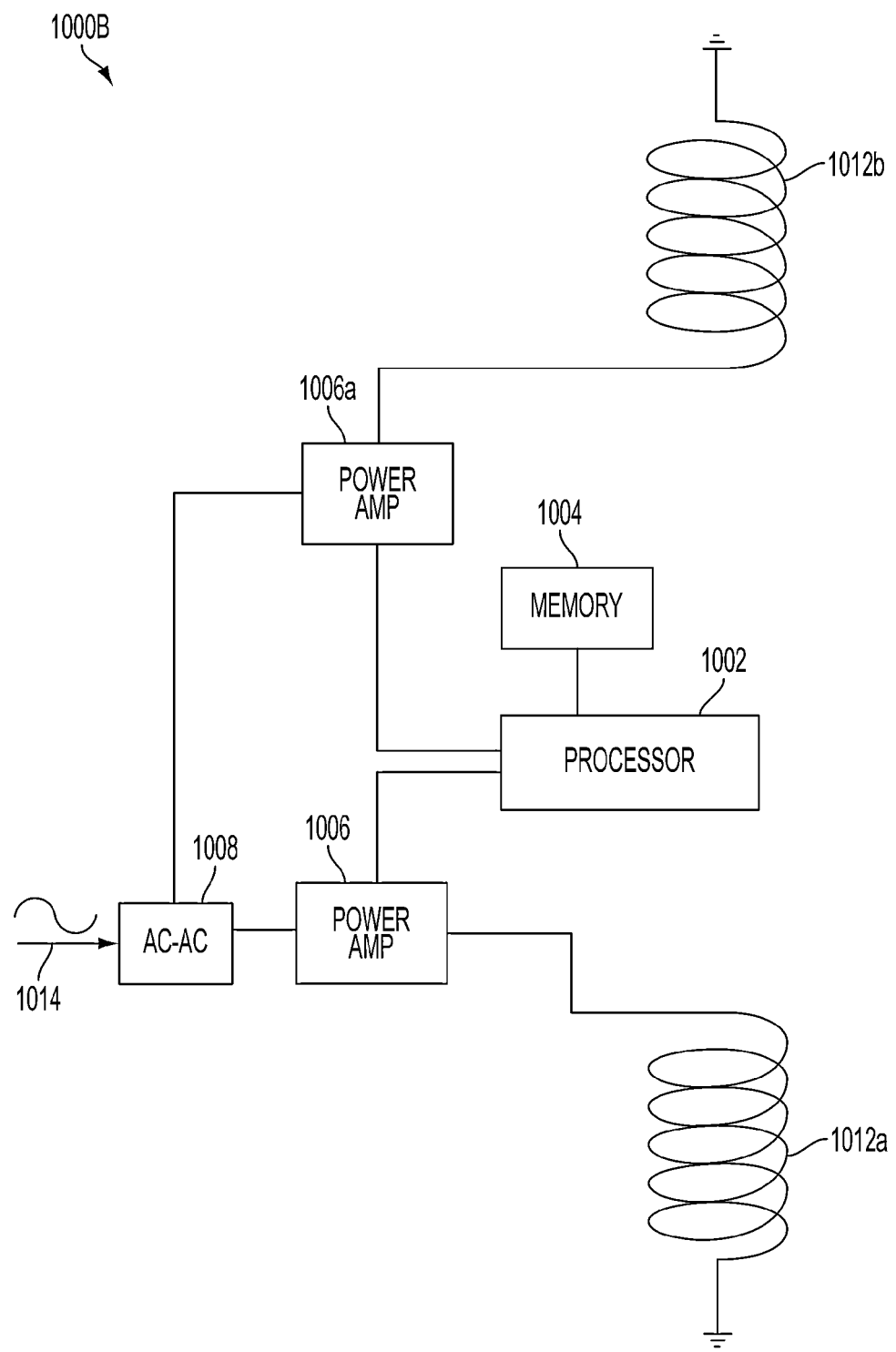
FIG. 10B is a block diagram of an alternative embodiment of an inductive charger circuit suitable for use with the various embodiments.

FIG. 10B illustrates an inductive charger circuit 1000B suitable for use with the various embodiments. The inductive charger circuit 1000B can be an embodiment of the RF charging circuitry 112 of FIG. 1. The inductive charger circuit 1000B differs from inductive charger circuit 1000A in that inductive charger circuit 1000B includes one or more additional power amplifiers 1006a connected to induction coil 1012b. Additional induction coils may be added and connected to their own additional power amplifiers. The addition of additional coils and power amplifiers may result in less resistance loss than would be the case from adding induction coils in series as discussed above with reference to FIG. 10A. Moreover, having multiple power amplifiers reduces the power and current rating for each power amplifier, thus simplifying the design for each power amplifier.

Figure 11A:
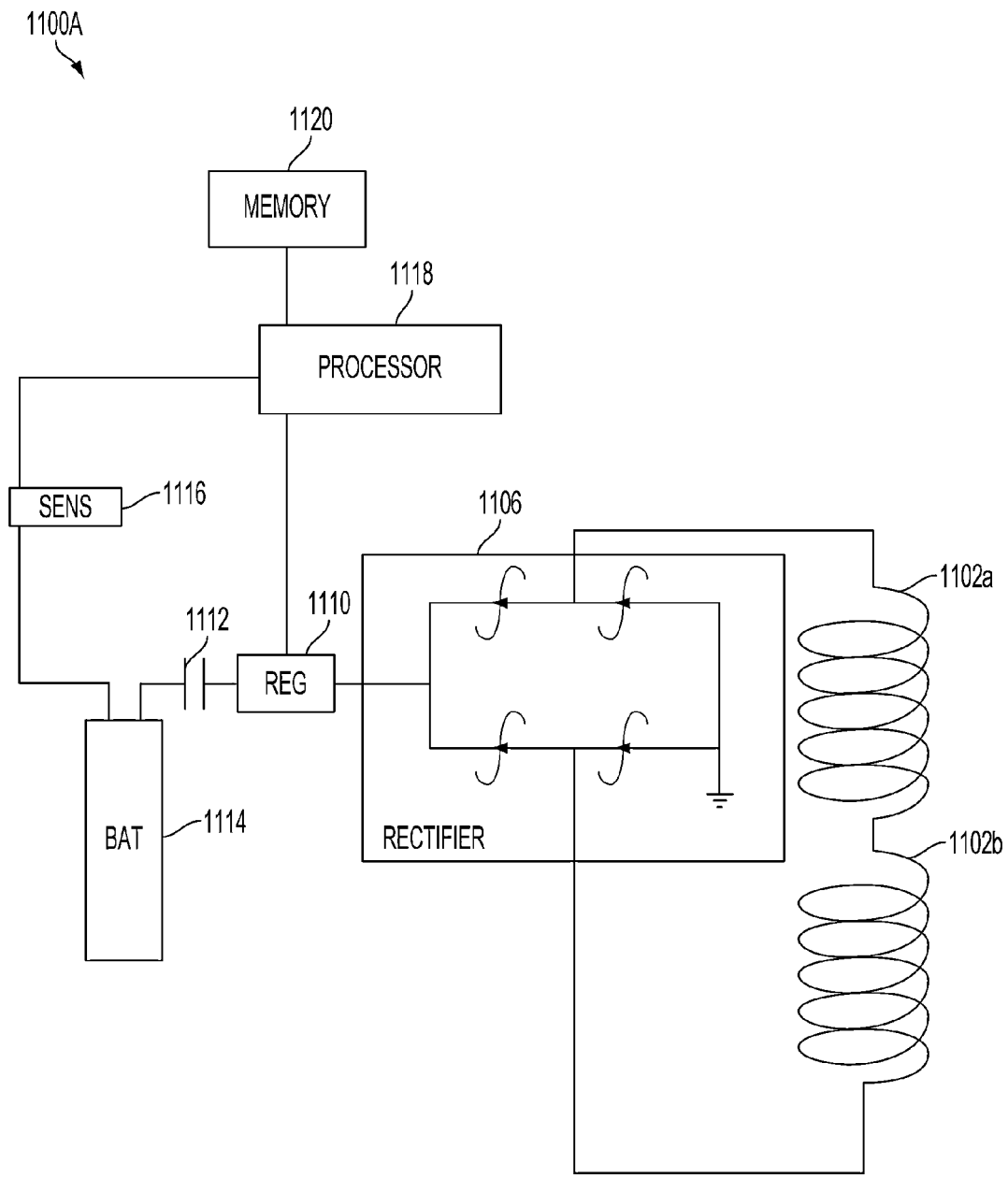
FIG. 11A is a block diagram of an inductive charging circuit suitable for use with the various embodiments.

FIG. 11A illustrates an inductive charging circuit including an inductive charging circuit 1100A suitable for use with the various embodiments. The inductive charger circuit 1000A can be an embodiment of the RF charge receiving circuitry 152 of FIG. 1. The inductive charging circuit 1100A is configured to enable a wireless charge receiving device associated with a receiver portion 150 to inductively receive power from an inductive charger circuit 1000A or 1000B discussed above with reference to FIGS. 10A and 10B. The inductive charging circuit 1100A may include two or more inductive coils 1102a and 1102b connected in series and coupled to a rectifier circuit 1106. Such a rectifier circuit 1106 may be any type rectifier, such as a two diode voltage doubler rectifier, a four diode full wave bridge rectifier, etc. Additional inductive coils, such as one, two, three, four, or more additional inductive coils, may be added in series with inductive coils 1102a and 1102b. The number of receive inductive coils included in the inductive charging circuit 1100A may be selected based on the number of surfaces on which a wireless rechargeable device may rest when placed on or near a wireless charger. In operation, the alternating magnetic field from the wireless charger induces an alternating current in the inductive coils 1102a and/or 1102b that passes through the rectifier circuit 1106. The output of the rectifier circuit 1106 may be coupled to an EMI filter/buck regulator 1110, which may be coupled to the processor 1118. The processor 1118 may be configured with processor-executable instructions to control the operation of the EMI filter/buck regulator 1110. The processor 1118 may be coupled to a memory 1120. The output of the EMI filter/buck regulator 1110 may be coupled to a capacitor 1112 and the output of the capacitor 1112 may be coupled to a battery 1114. The battery 1114 may be coupled to a battery charge sensor 1116 that may be coupled to the processor 1118. The battery charge sensor 1116 may output indications of measurements of the battery's 1114 charge to the processor 1118, which the processor may use to regulate power applied to the battery 1114 to avoid overcharging.

In operation, when the charging circuit 1100A is placed in an alternating electromagnetic field, such as an alternating electromagnetic field generated by a charger circuit 1000A or 1000B discussed above with reference to FIGS. 10A and 10B, the inductive coils 1102a and/or 1102b generate an alternating electrical current that the rectifier circuit 1106 may rectify into direct current (DC) that the EMI filter/buck regulator 1110 may filter and boost the current's voltage. The output of the EMI filter/buck regulator 1110 may be received by the capacitor 1112 that stores electrical energy. After charging the capacitor 1110 to capacity, current drawn from the capacitor may be used to charge the battery 1114. The battery charge sensor 1116 may enable the processor 1118 to monitor the battery 1114 charge level and determine when the battery is fully charged. Additionally, the battery charge sensor 1116 may enable the processor 1118 to determine a rate of charge for the battery 1114.

Figure 11B:
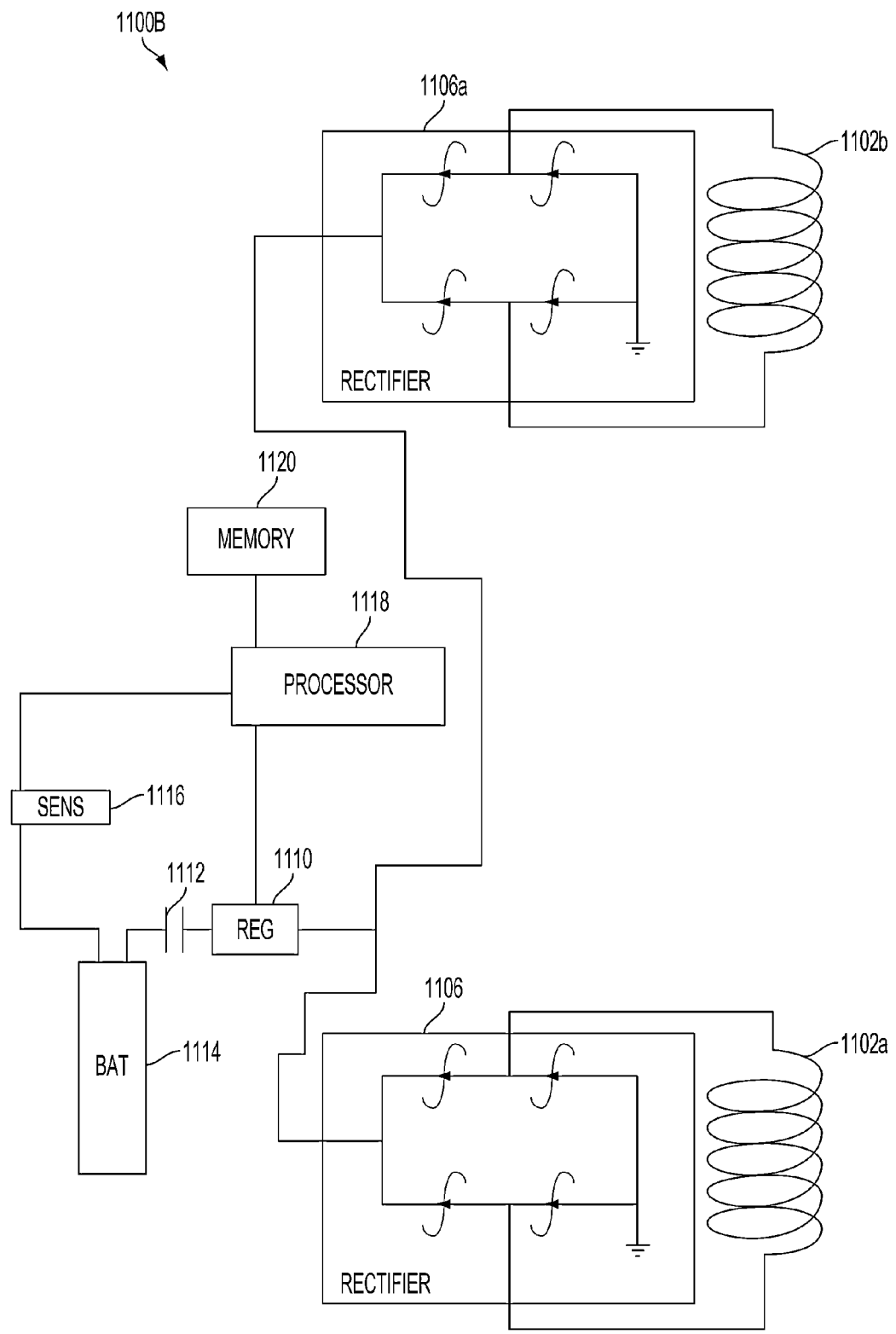
FIG. 11B is a block diagram of an alternative embodiment of an inductive charging circuit suitable for use with the various embodiments.

FIG. 11B illustrates an inductive charging circuit 1100B suitable for use with the various embodiments. The inductive charging circuit 1100B illustrated in FIG. 11B differs from the inductive charging circuit 1100A illustrated in FIG. 11A in that the inductive charging circuit 1100B includes one or more additional rectifier circuit 1106a connected to a second induction coil 1102b. Additional induction coils may be added connected to their own additional rectifier circuits. The addition of additional induction coils and rectifier circuits may result in less resistance loss than adding induction coils in series as discussed above with reference to FIG. 11A.

Figure 12A:
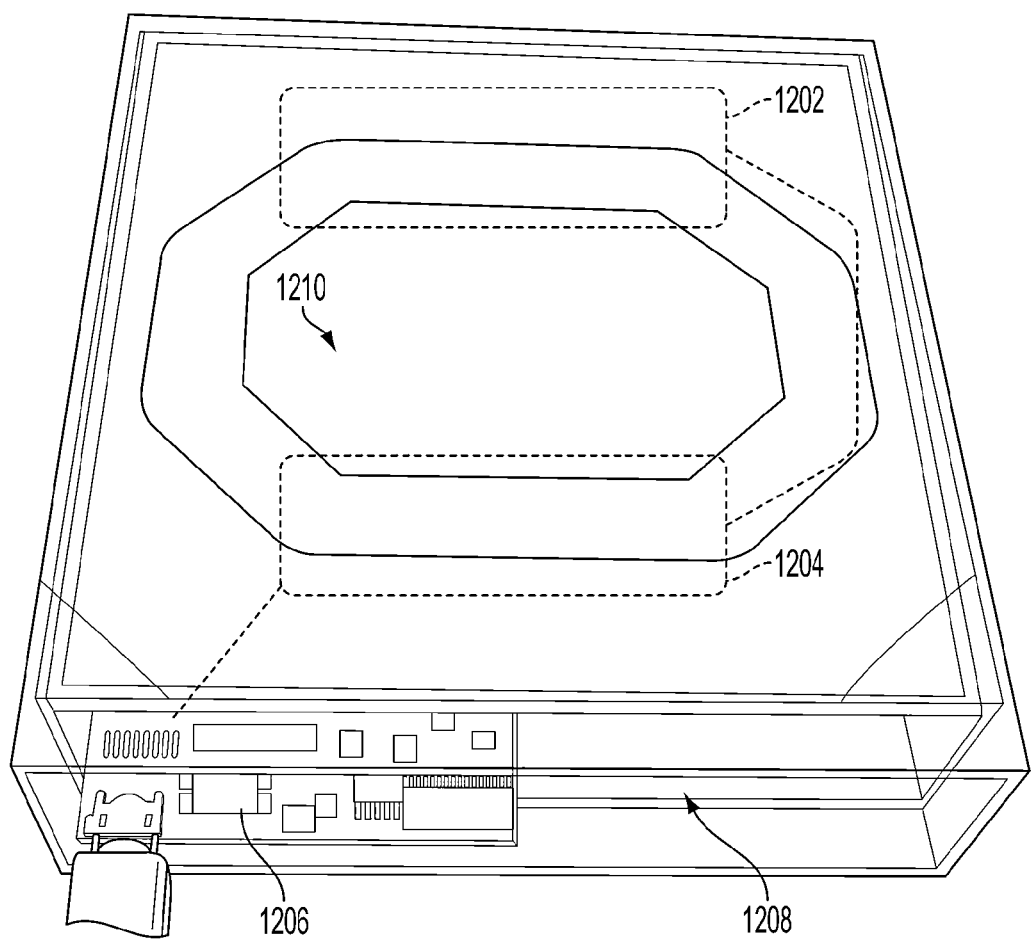
FIGS. 12A-12F illustrate various components of an embodiment of a wireless charging system.

FIGS. 12A through 12F illustrate various elements of an embodiment of a wireless charging system. FIG. 12A is a top view of a wireless charger 1208. The wireless charger 1208 may include inductive transmit coils 1202 and 1204. The inductive transmit coils 1202 and 1204 may be embedded in a charging surface 1210 of the wireless charger 1208. In an embodiment, the charging surface 1210 may include a graphic guide to assist a user in aligning the wireless rechargeable device 1252 (described with more detail below with reference to FIG. 12C) on the wireless charger 1208. In an embodiment, the inductive transmit coils 1202 and 1204 may be low profile coils using American Wire Gauge 30 wires (approx. 0.26 mm diameter), for example, or other coils having other suitable properties. The wireless charger 1208 may include an inductive charge circuit 1206 to which the inductive transmit coils 1202 and 1204 are electrically connected. In the embodiment illustrated in FIGS. 12A through 12F, the inductive transmit coils 1202 and 1204 are connected in series to the inductive charge circuit 1206. In alternative embodiments, the inductive transmit coils 1202 and 1204 may not be connected in series, and instead each inductive transmit coil 1202 and 1204 may be connected to a separate power amplifier on the inductive charger circuit 1206.

Figure 12B:
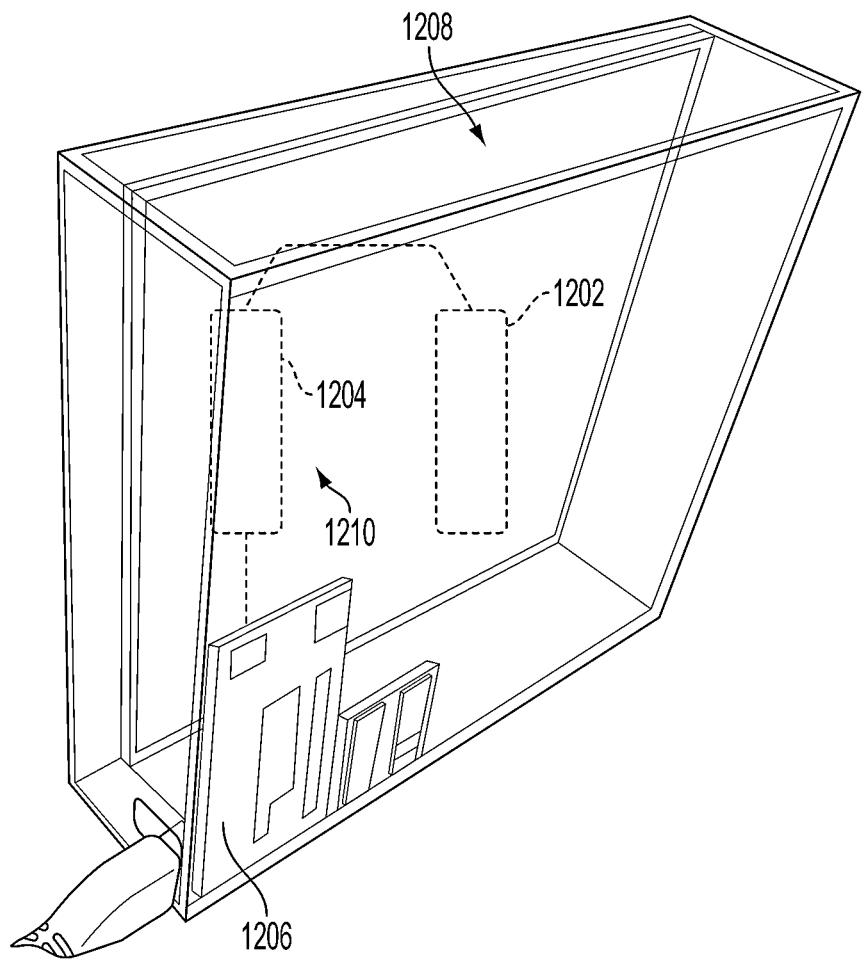

In an embodiment, the wireless charger 1208 may include the packaging in which the wireless rechargeable device 1252 (described with more detail below with reference to FIG. 12C) may be sold. As an example, the inductive transmit coils 1202 and inductive charger circuit 1206, and charging surface 1210 may be integrated into the case in which the wireless rechargeable device 1252 is sold. Also, the wireless charger 1208 may include a graphic guide to assist a user in aligning the wireless rechargeable device on a wireless charger surface. In an embodiment, the wireless charger 1208 may include an LED indicator that may indicate information. As an example, a blinking LED may indicate a power mode, such as a low power beacon mode, and a continuously illuminated LED may indicate that the charger 1208 is charging a wireless rechargeable device. FIG. 12B is a bottom view of the wireless charger 1208 showing the inductive transmit coils 1202 and 1204 connected to the inductive charging circuit 1206 and the back of the charging surface 1210.

Figure 12C:
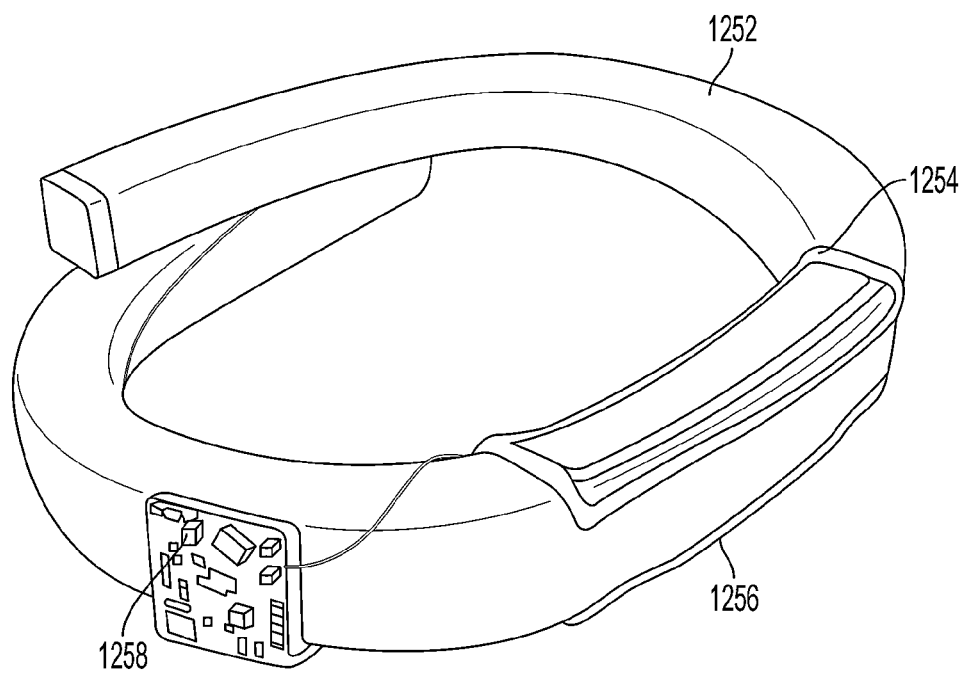
Figure 12D:
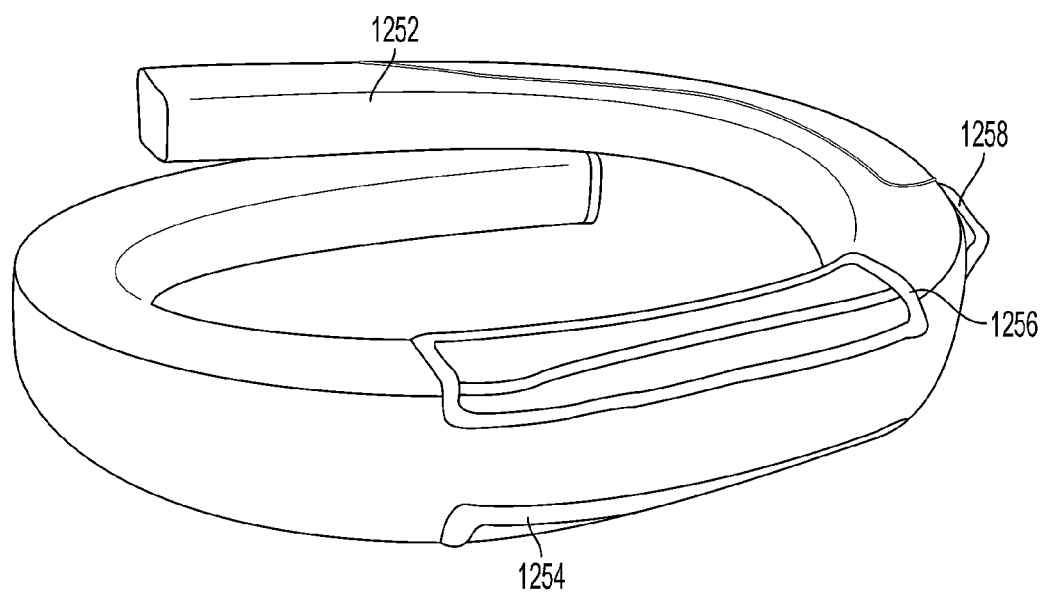

FIG. 12C is a perspective view of an embodiment of a wireless rechargeable device 1252. The wireless rechargeable device 1252 may be configured to rest on at least one, preferably at least two of its surfaces. For example, the wireless rechargeable device 1252 may be a wrist watch and may be configured to rest on a first side of the band and a second side of the band depending on which it is laid down by a user. While illustrated as having two surfaces on which it may rest, the wireless rechargeable device 1252 may be configured to rest on more than two surfaces. On a first of the surfaces on which it is configured to rest, the wireless rechargeable device 1252 may include a first inductive receiver coil 1254. On a second of the surfaces on which it is configured to rest, the wireless rechargeable device 1252 may include a second inductive receiver coil 1256. The inductive receiver coils 1254 and 1256 may be connected to an inductive charging circuit 1258 as described above. In an embodiment, the inductive charging circuit 1258 may measure 10 mm by 10 mm. In an embodiment, the inductive receiver coils 1254 and 1256 may be connected in series to the inductive charging circuit 1258. In another embodiment, the coils may be independent of each other, and the inductive charging circuit 1258 may include a rectifier circuit for each inductive receiver coil 1254 and 1256. In an embodiment, the wireless rechargeable device may include an LED to indicate that the wireless rechargeable device 1252 is charging. FIG. 12D illustrates the wireless rechargeable device in the opposite orientation resting on its first surface with the second inductive receiver coil 1256 oriented up and the first inductive receiver coil 1254 oriented down.

Figure 12E:
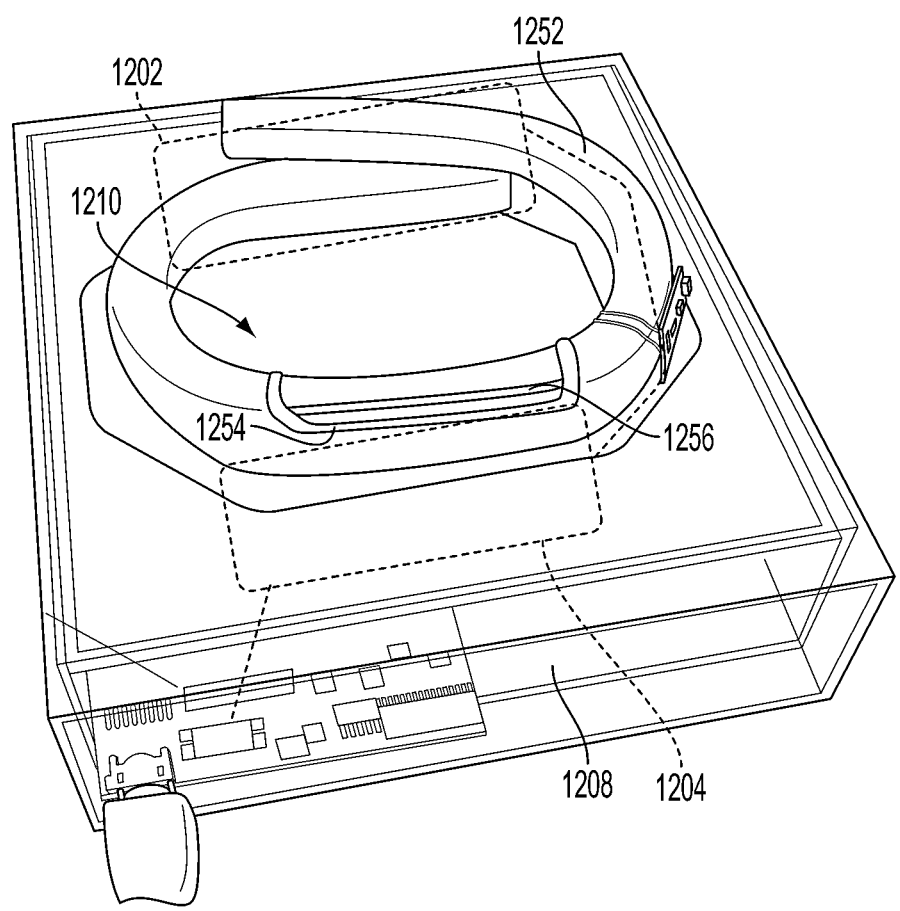
Figure 12F:
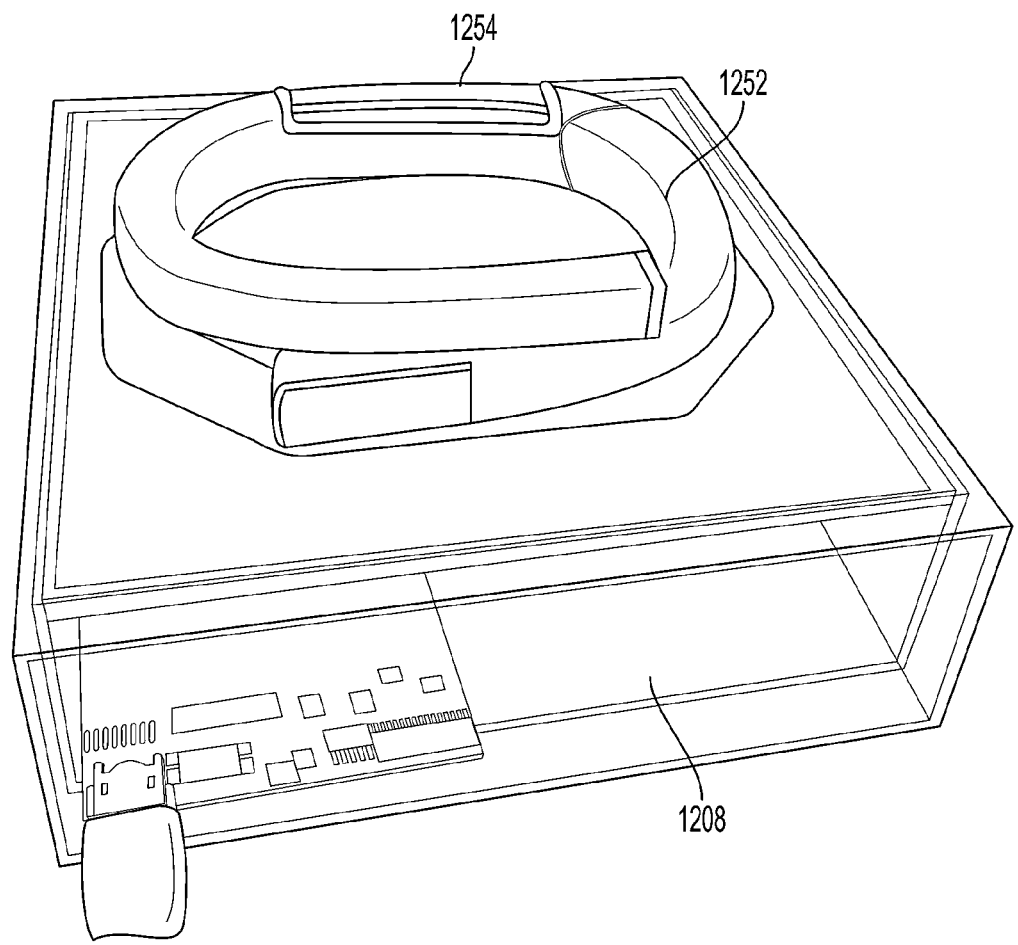

FIG. 12E shows the wireless rechargeable device 1252 placed on the wireless charger 1208 in a charging configuration. The wireless rechargeable device 1252 is placed on the charging surface 1210 with the first surface of the wireless rechargeable device 1252 pointed down. When the wireless rechargeable device 1252 is placed on the charging surface 1210 of the wireless charger 1208, while all coils may not align to enable power to be wirelessly transmitted (e.g., inductive receiver coil 1256 may not align with a transmit coil and inductive transmitter coil 1202 may not align with a receiver coil), the probability that one receiver coil and one transmit coil (e.g., inductive receiver coil 1254 and inductive transmitter coil 1204) will align to wirelessly transmit power from the wireless charger to the wireless rechargeable device is increased. FIG. 12F illustrates another placement of the wireless rechargeable device 1252 on the wireless charge 1208 that may align different receiver and transmit coils, thereby enabling wireless power transmission.

Figure 13:
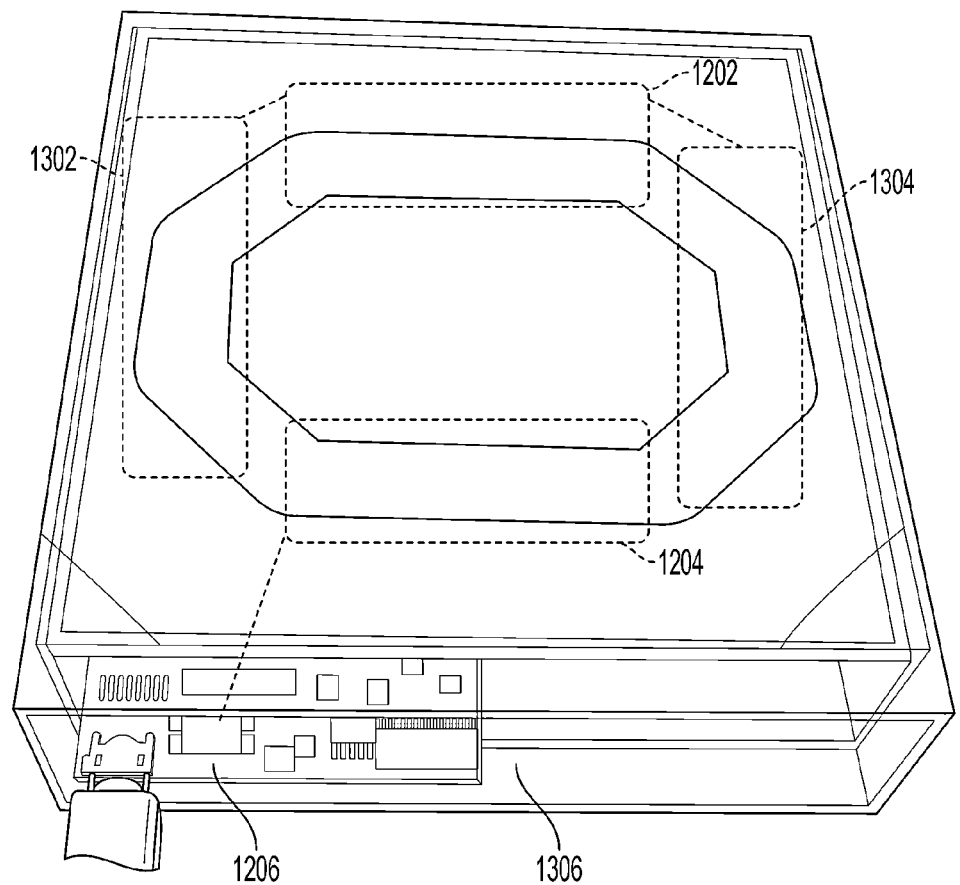
FIG. 13 illustrates a power transmitter of a wireless charging system according to another embodiment.

FIG. 13 illustrates a wireless charger (i.e., transmitter portion) 1306 of a wireless charging system according to another embodiment. The wireless charging system in which the wireless charger 1306 is included may be similar to the wireless charging system discussed above with reference to FIGS. 12A through 12F above, except that the wireless charger 1306 may include two additional inductive transmit coils 1302 and 1304. In this manner, additional orientations of the wireless charger 1306 and the wireless rechargeable device 1252 may enable wireless transmission of power.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A wrist-worn charge-receiving device, comprising:
an antenna coil adapted to receive radio frequency (RF) charging energy, the antenna coil comprising non-uniform windings, wherein the non-uniform windings comprise a first area and a second, different area, wherein a spacing of the windings in the first area is narrower than a spacing of the windings in the second area, wherein the first area is located in a plane that is different than a plane in which the second area is located, wherein the non-uniform windings are spaced so as to create tilts in a plurality of charging planes with respect to the planes formed by the major axes of a Cartesian coordinate system, and wherein the planes formed by the major axes of the Cartesian coordinate system comprise an x-y plane, an x-z plane, and a y-z plane; and
a rechargeable power source coupled to the antenna coil, the antenna coil adapted to provide the RF charging energy to the rechargeable power source.

2. The wrist-worn charge-receiving device of claim 1, wherein the antenna coil comprises a "C" shaped position.

3. The wrist-worn charge-receiving device of claim 2, wherein the antenna coil comprises a loop-shaped position and is configured to be moved between the loop-shaped position and the C-shaped position.

4. The wrist-worn charge-receiving device of claim 1, wherein the wrist-worn charge-receiving device further comprises a wristband, the wristband including the antenna coil and the rechargeable power source.

5. The wrist-worn charge-receiving device of claim 4, wherein the wristband is configured to be moved between a loop-shaped position and a C-shaped position.

6. A system for wirelessly charging a wrist-worn device, comprising:
a radio frequency (RF) charging energy generating element;
a transmit antenna configured to radiate the RF charging energy, the transmit antenna comprising a first coil and a second coil, the first coil and the second coil each comprising a plurality of windings, the windings of the first coil being wound in a direction opposite the direction of the windings of the second coil, and wherein the second coil is located within a periphery of the first coil and the first and second coils are configured to produce a magnetic field that is focused in an area between the first coil and the second coil; and
a charge receiving device located between the first coil and the second coil, the charge receiving device comprising a receive antenna coil and a rechargeable power source coupled to the receive antenna coil, the receive antenna coil comprising non-uniform windings adapted to receive the RF charging energy and provide the RF charging energy to the rechargeable power source, wherein the non-uniform windings comprise a first area and a second, different area, wherein a spacing of the windings in the first area is narrower than a spacing of the windings in the second area, wherein the first area is located in a plane that is different than a plane in which the second area is located, wherein the non-uniform windings are spaced so as to create tilts in a plurality of charging planes with respect to the planes formed by the major axes of a Cartesian coordinate system, and wherein the planes formed by the major axes of the Cartesian coordinate system comprise an x-y plane, an x-z plane, and a y-z plane.

7. The system of claim 6, wherein the receive antenna coil comprises a "C" shaped position.

8. The system of claim 7, wherein the receive antenna coil comprises a loop-shaped position and is configured to be moved between the loop-shaped position and the C-shaped position.

9. The system of claim 6, wherein the charge-receiving device further comprises a wristband, the wristband including the receive antenna coil and the rechargeable power source.

10. The system of claim 9, wherein the wristband is configured to be moved between a loop-shaped position and a C-shaped position.

11. A wireless charging system, comprising:
a wireless rechargeable device configured to rest on at least two of its surfaces, the wireless rechargeable device comprising a first inductive receiver coil positioned on or near a first of the at least two surfaces, and a second inductive receiver coil positioned on or near a second of the at least two surfaces; and
a wireless charger comprising one or more inductive transmit coils configured to wirelessly transmit power to the wireless rechargeable device, wherein to wirelessly transmit power, the wireless charger is configured to generate an alternating magnetic field, in the one or more inductive transmit coils, that induces an alternating current in at least one of the first inductive receiver coil or the second inductive receiver coil when the one or more inductive transmit coils are aligned with at least one of the first inductive receiver coil or the second inductive receiver coil.

12. The wireless charging system of claim 11, wherein the one or more inductive transmit coils comprises two inductive transmit coils.

13. The wireless charging system of claim 11, wherein the wireless rechargeable device is configured to rest on only two of its surfaces.

14. The wireless charging system of claim 11, wherein:
the wireless rechargeable device is configured to rest on more than two of its surfaces,
each of the wireless rechargeable device's surfaces includes its own inductive receiver coil, and
the wireless charger is configured to wirelessly transmit power to the wireless rechargeable device when any of the wireless rechargeable device's inductive receiver coils aligns with the one or more inductive transmit coil.

15. The wireless charging system of claim 11, wherein the wireless rechargeable device comprises more than one inductive receiver coil on any of its surfaces.

16. The wireless charging system of claim 11, wherein the one or more inductive transmit coils comprise two or more inductive transmit coils.

17. The wireless charging system of claim 16, wherein the two or more inductive transmit coils comprise four inductive transmit coils.

18. The wireless charging system of claim 11, wherein the two or more inductive receiver coils of the wireless rechargeable device are connected in series.

19. The wireless charging system of claim 11, wherein the wireless rechargeable device further comprises a rectifier circuit electrically coupled to one or more of the inductive receiver coils.

20. The wireless charging system of claim 19, wherein the rectifier circuit is a two diode voltage double rectifier.

21. The wireless charging system of claim 11, wherein the inductive transmit coils of the wireless charger are connected in series.

22. The wireless charging system of claim 11, wherein each of the inductive transmit coils of the wireless charger are connected to a respective power amplifier.

23. The wireless charging system of claim 11, wherein the wireless charger comprises packaging in which the wireless rechargeable device is sold.

24. The wireless charging system of claim 11, wherein a charging surface of the wireless charger includes a graphic guide to assist a user in aligning the wireless rechargeable device on the wireless charger.

* * * * *